US008239905B2

(12) United States Patent
Li et al.

(10) Patent No.: US 8,239,905 B2
(45) Date of Patent: Aug. 7, 2012

(54) LECTURE CAPTURE AND BROADCAST SYSTEM

(75) Inventors: Fan Li, Beijing (CN); Jian-guang Lou, Beijing (CN); Yusuo Hu, Beijing (CN); Qingwei Lin, Beijing (CN); Jiang Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 751 days.

(21) Appl. No.: 12/357,627

(22) Filed: Jan. 22, 2009

(65) Prior Publication Data

US 2010/0186056 A1      Jul. 22, 2010

(51) Int. Cl.
*H04N 7/173*      (2011.01)
(52) U.S. Cl. ............ 725/109; 725/78; 725/87; 725/110; 725/119
(58) Field of Classification Search .......... 725/109–110, 725/78, 87, 119; 709/248–249, 231
See application file for complete search history.

(56) References Cited

U.S. PATENT DOCUMENTS

| | | | |
|---|---|---|---|
| 6,728,753 B1* | 4/2004 | Parasnis et al. ............... | 709/203 |
| 6,789,228 B1 | 9/2004 | Merril et al. | |
| 7,330,875 B1 | 2/2008 | Parasnis et al. | |
| 2003/0118014 A1* | 6/2003 | Iyer et al. ....................... | 370/389 |
| 2005/0262201 A1* | 11/2005 | Rudolph et al. ............. | 709/205 |
| 2006/0005136 A1 | 1/2006 | Wallick et al. | |
| 2007/0020604 A1 | 1/2007 | Chulet | |
| 2007/0094405 A1* | 4/2007 | Zhang ........................... | 709/231 |
| 2008/0209330 A1 | 8/2008 | Cruver | |
| 2008/0288890 A1* | 11/2008 | Anderson et al. ............. | 715/810 |
| 2009/0183208 A1* | 7/2009 | Christensen et al. ........... | 725/58 |
| 2009/0183209 A1* | 7/2009 | Wilfinger ....................... | 725/75 |

OTHER PUBLICATIONS

Abowd, "Classroom 2000: An Experiment With the Instrumentation of a Living Educational Environment", IBM Systems Journal, vol. 38, 1999, pp. 508-530.

Amir, et al., "Automatic Generation of Conference Video Proceedings", Elsevier Inc., 2004, pp. 467-488.

Baecker, "A Principled Design for Scalable Internet Visual Communications with Rich Media, Interactivity, and Structured Archives", IBM Centre for Advanced Studies Conference, Proceedings of the 2003 conference of the Centre for Advanced Studies on Collaborative Research, 2003, pp. 16-29, 14 pgs.

(Continued)

*Primary Examiner* — Pankaj Kumar
*Assistant Examiner* — Mulugeta Mengesha
(74) *Attorney, Agent, or Firm* — Lee & Hayes, PLLC (57) ABSTRACT

An end-to-end lecture broadcast system (LBS) is described. The LBS system typically comprises three modules: a schedule module, a capture module and a transmission module. The schedule module is comprised of a scheduler that is implemented as a software add-on on the lecture host's computing device, a schedule server, and a schedule agent component in the uploading peer to provide for channel based management. The capture module is comprised of a video camera for capturing video content, one or more microphones for capturing audio content, and a VGA signal capture for capturing presentation materials. The transmission module is comprised of an uploading peer and a web server. The uploading peer is responsible for transmitting video/audio content to the Internet/intranet using peer-to-peer (P2P) streaming technology. The web server is responsible for the delivery of captured presentation materials and for ensuring the synchronous play back of video/audio content and presentation materials.

20 Claims, 6 Drawing Sheets

OTHER PUBLICATIONS

Bianchi, "A Fully Automatic, Multi-Camera System to Televise Auditorium Presentations", retrieved on Feb. 17, 2009 at << http://www.autoauditorium.com/nist/autoaud.html>> Presented at the 1998 Joint DARPA/NIST Smart Spaces Technology Workshop, National Institute of Standards and Technology, Jul. 30-31, 1998, 11 pgs.

Bianchi, "Automatic Video Production of Lectures Using an Intelligent and Aware Environment", ACM International Conference Proceeding Series, vol. 83, Proceedings of the 3rd International Conference on Mobile and Ubiquitous Multimedia, ACM, 2004, pp. 117-123, 7 pgs.

BMRC *** People Page, Diane Harley, Ph.D., Recent Papers, retrieved on Mar. 17, 2009 at <<http://bmrc.berkeley.edu/people/dianeh/>>, 3 pgs. (Note Reference to "Digital Chemistry 1A: An Economic Analysis of Technology Enhancements in a Large Lecture Course at UC Berkeley" and new published title "University Teaching as E-Business Research and Policy Agendas.").

Cherkasova, et al., "Characterizing Locality, Evolution and Life Span of Accesses in Enterprise Media Server Workloads", Proceedings of the 12th International Workshop on Network and Operating Systems Support for Digital Audio and Video, ACM, 2002, pp. 33-42.

Cruz, et al., "Capturing and Playing Multimedia Events with STREAMS", Proceedings of the second ACM International Conference on Multimedia, ACM, New York, NY, 1994, pp. 193-200.

Davis, et al., "NotePals: Lightweight Note Sharing by the Group, for the Group", retrieved at <<http://dub.washington.edu:2007/projects/notepals/pubs/notepals-chi99-final.pdf>> Cached page from Google, ACM, Conference on Human Factors in Computing Systems, Proceedings of the SIGCHI Conference on Human Factors in Computing Systems: the CHI is the Limit, 1999, pp. 338-345, 9 pgs.

Friedland, "Adaptive Audio and Video Processing for Electronic Chalkboard Lectures", Publisher: Lulu.com, retrieved on Feb. 18, 2009 at <<http://www.diss.fu-berlin.de/diss/servlets/MCRFileNodeServlet/FUDISS_derivate_000000002354/04_fland_chap02.pdf;jsessionid=60DD5D9EB884F52AEA0621093639B9AE?hosts=>>, Dec. 26, 2006 (Dissertation on Oct. 30, 2006), pp. 5-20, 17 pages.

Gleicher, et al., "Towards Virtual Videography", In Proceedings of the eighth ACM Conference on Multimedia, Los Angeles, California, USA, 2000, ACM Multimedia, 2000, pp. 375-378, 4 pages.

Harley, et al. The Usefulness of Lecture Webcasts in Large Lecture Courses: A Preliminary Evaluation of the Berkeley Internet Broadcasting System, Internal Report, Center for Studies in Higher Education, U.C. Berkeley, Jun. 30, 2000.

Harley, et al., "University Teaching as E-Business? Research and Policy Agendas", Selected Conference Proceedings, University of California, Berkeley, Oct. 26-27, 2001, 130 pgs. (Note: The original project title is "Digital Chemistry 1A: An Economic Analysis of Technology Enhancements in a Large Lecture Course at UC Berkeley"), Nov. 8, 2000.).

He, et al., "Designing Presentations for On-Demand Viewing", Proceedings of the 2000 ACM Conference on Computer Supported Cooperative Work, ACM, 2000, pp. 127-134.

He, et al., "Real-Time Whiteboard Capture and Processing Using a Video Camera for Teleconferencing", IEEE International Conference on Acoustics, Speech, and Signal Processing, vol. 2, Mar. 18-23, 2005, pp. 1113-1116.

Heck, et al., "Virtual Videography", ACM Transactions on Multimedia Computing, Communications, and Applications (TOMCCAP), vol. 3, Issue 1, Article No. 4, Feb. 2007, 28 pgs.

Landay, "CS 294-7: CSCW Using CSCW", retrieved at <<http://bmrc.berkeley.edu/courseware/cscw/fall97/>>, 1997, 2 pgs.

Liu, et al., "Lecture Videos for E-learning: Current Research and Challenges", IEEE sixth International Symposium on Multimedia Software Engineering, Dec. 13-15, 2004, pp. 574-578.

Livelink ECM, "Eloquent Media Server", retrieved on Nov. 24, 2008 at <<http://www.opentext.com/2/pro-II-eloquentmediaserver.htm>>, Open Text Corporation, 2 pgs.

Liwei, et al., "Auto-Summarization of Audio-Video Presentations", Proceedings of the seventh ACM International Conference on Multimedia (Part 1), ACM, 1999, pp. 489-498.

Machnicki, "Virtual Director: Automating a Webcast", In Proceedings of the SPIE Mulitmedia Computing and Networking, 2002, retrieved at <<http://citeseerx.ist.psu.edu/viewdoc/summary?doi=10.1.1.11.2005>>, pp. 208-225, 38 pgs.

Matsuo, et al., "Mining Video Editing Rules in Video Streams", Proceedings of the tenth ACM International Conference on Multimedia, ACM, 2002, pp. 255-258.

Mertens, et al., "Automation Techniques for Broadcasting and Recording Lectures and Seminars" retrieved on Nov. 21, 2008 at <<http://www.inf.uos.de/papers_pdf/2003_03.pdf>> Sep. 2003, 8 pgs.

Mukhopadhyay, et al., "Passive Capture and Structuring of Lectures", Proceedings of the seventh ACM International Conference on Multimedia (Part 1), ACM, 1999, pp. 477-487.

Onishi, et al., "Shooting the Lecture Scene Using Computer-Controlled Cameras Based on Situation Understanding and Evaluation of Video Images", Proceedings of the 17th International Conference on Pattern Recognition, vol. 1, Aug. 23-26, 2004, pp. 781-784.

Personal Communication, USQ, University of Southern Queensland, Library, retrieved on Nov. 24, 2008 at <<http://www.usq.edu.au/library/help/ehelp/ref_guides/apastyle/personal.htm>>, Updated Sep. 30, 2008, 1 pg.

Rowe, et al., "BIBS: A Lecture Webcasting System" BMRC Technical Report Jun. 2001, pp. 1-23.

Rowe, et al., "Capturing Conference Presentations", IEEE Computer Society, IEEE Mulitmedia, Oct.-Dec. 2006, vol. 13, Issue 4, pp. 76-84.

Rui, et al., "Building an Intelligent Camera Management System", Proceedings of the ninth ACM International Conference on Multimedia, 2001, pp. 2-11.

Rui, et al., "Time Delay Estimation in the Presence of Correlated Noise and Reverberation", available as early as 2003, retrieved at <<http://research.microsoft.com/pubs/69982/tr-2003-01.pdf>> IEEE International Conference on Acoustics, Speech, and Signal Processing, May 17-21, 2004, vol. 2, pp. 133-136, 5 pgs.

Scott, et al., "Graduating Live and On-Line: The Multimedia Webcast of the Open University's Worldwide Virtual Degree Ceremony", The Open University, UK, 2001, pp. 1-6.

Shimada, et al., "Automatic Camera Control System for a Distant Lecture Based on Estimation of Teacher's Behavior", retrieved on Nov. 21, 2008 at <<https://qir.kyushu-u.ac.jp/dspace/bitstream/2324/4031/1/ShimadaCATE04.pdf>>, Proceedings of the Seventh IASTED International Conference, Aug. 16-18, 2004, pp. 106-111.

Steinmetz, et al., "The e-Seminar Lecture Recording and Distribution System", In Proceedings of the SPIE Multimedia Computing and Networking 2001, vol. 4312, 25 (2000), 12 pgs.

Sun, et al., "Recording the Region of Interest from Flycam Panoramic Video" retrieved on Nov. 21, 2008 at <<http://www.fxpal.com/publications/FXPAL-PR-01-031.pdf>>, Proc. ICIP, 2001, pp. 409-412.

Tang, et al., "Why do Users Like Video? Studies of Multimedia-Supported Collaboration", retrieved at <<http://research.sun.com/features/tenyears/volcd/papers/2Tang.pdf>>, Sun Microsystems, Inc., Technical Report: TR-92-5, 1992, pp. 1-28.

Tashev, et al., "A New Beamformer Design Algorithm for Microphone Arrays", Microsoft Research, Acoustics, Speech, and Signal Processing, 2005. Proceedings. (ICASSP '05). IEEE International Conference, Mar. 18-23, 2005, vol. 3, pp. 101-104, 4 pgs.

Wallick, et al., "A Portable Solution for Automatic Lecture Room Camera Management", IEEE International Conference on Multimedia and Expo., Jun. 30, 2004, vol. 2, pp. 987-990.

Wang, et al., "Synchronization of Lecture Videos and Electronic Slides by Video Text Analysis", Proceedings of the eleventh ACM International Conference on Multimedia, 2003, pp. 315-318.

Yokoi, et al., "Virtual Camerawork for Generating Lecture Video From High Resolution Images", IEEE International Conference on Multimedia and Expo, Jul. 6-8, 2005, 4 pgs.

"Your Presentation or Lecture Live on Internet in 5 Easy Steps!" retrieved on Nov. 21, 2008 at <<http://www.presentations2go.eu/images%5Cdownloads%5Cp2g-flyer-uk.pdf>>, Can-iT B. V., Wageningen University and Research Centre, the Netherlands, 2 pgs.

Yu, et al., "dc: A Live Webcast Control System", Berkeley Muiltmedia Research Center, retrieved at <<http://citeseerx.ist.psu.edu/viewdoc/download?doi=10.1.1.6.4553&rep=rep1&type=pdf>>, SPIE/IS&T Multimedia Computing and Networking Conference, vol. 4312, San Jose CA, Jan. 2001, 10 pgs.

Zhang, et al., "Hybrid Speaker Tracking in an Automated Lecture Room", IEEE International Conference on Multimedia and Expo, 2005, ICME 2005, Jul. 6-8, 2005, 4 pgs.

Finn, et al., "Video-Mediated Communication" Lawrence Erlbaum Associates Inc., Hillsdale, NJ, USA, 1997, 570 pages.

* cited by examiner

LECTURE CAPTURE AND BROADCAST SYSTEM

BACKGROUND

Lecture broadcasting or webcasting systems have become more prevalent in recent years. With more frequent academic and technical exchanges, thousands of lectures and training sessions are held in universities, conferences, or even corporations and, as a result, live broadcasting of lectures in these places is becoming more and more attractive. However, the cost of live lecture broadcasting has been prohibitive. The costs include the hardware cost and recurring labor cost of service providers, lecture hosts, and speakers. A complete end-to-end solution that can effectively reduce the cost is highly demanded.

Existing systems have been used, however, these systems have demonstrated various shortcomings. For instance, the video/audio delivery is not scalable due to the performance bottleneck of the streaming server. In addition, presentation materials need to be edited manually to synchronize with video/audio content. As a result, a separate plug-in may have to be installed in the presentation PC, which means the presentation PC must be managed by a service provider. To control the process of scheduling, capturing and broadcasting, a console may run on a control machine, which also has to be operated by a service provider. Finally, the schedule can only be published on the web page meaning it cannot be updated to end users effectively.

SUMMARY

An end-to-end live lecture broadcasting system is described. The broadcasting system possesses features such as a channel-based program scheduling and a management system operated through a calendaring program. The system also includes a real-time video/audio and presentation materials capturing mechanism utilizing an algorithm that provides automatic on-the-fly capturing of presentation materials from the presenter's computing device. The system also provides for transmission of the presentation's video/audio content using peer-to-peer (P2P) streaming technology. Finally, the system provides for uploading of the presentation materials to provide for synchronous playback of video/audio and presentation materials at a peer who requests access to the presentation.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

DETAILED DESCRIPTION

Overview

This document describes a complete end-to-end live lecture broadcast system (LBS). Through the LBS, service providers can easily setup a broadcasting environment and lecture hosts can schedule and manage programs without the help of service providers. Service providers may include anyone assigned the task of setting up a live lecture broadcast, whether an employee or a third party provider. A service provider may include IT personnel or a third party provider that specializes in the live broadcast business. The whole broadcasting process is transparent to speakers, as a speaker is required only to do a minimal amount of work in order to broadcast his/her lecture. As a result, the cost of live lecture broadcasting can be minimized.

In some instances, the LBS system includes three modules: a schedule module, a capture module and a transmission module.

The schedule module is comprised of a scheduler that is implemented as an add-on to the lecture host's PC, a schedule server, and a schedule agent component in the uploading peer. For instance, the schedule module may be an add-on to a calendaring program running on these systems, such as an Outlook® calendaring program. Because the uploading peer is unique for each channel, the schedule agent is also unique for each channel. Therefore, the program schedule process in the lecture broadcasting system is channel-based, and the schedule server performs channel-based program schedule management. Each schedule agent has to be registered with a schedule server so that the schedule agent is available and manageable. A lecture host has to schedule a program through an software add-on, which will then submit the schedule request to the schedule server.

The capture module includes a video camera(s) for capturing video content, microphone(s) for capturing audio content, and a VGA signal capture for capturing presentation materials. Some or all the captured materials are processed in the uploading peer before being broadcasted.

The transmission module includes an uploading peer and a web server. The uploading peer is responsible for transmitting video/audio content through a network to one or more peers of a peer-to-peer (P2P) architecture using P2P streaming technology. The web server is responsible for the delivery of captured presentation materials and for ensuring the synchronous play back of video/audio content and presentation materials.

In the LBS system, there are several issues that need to be addressed. The first is the capturing and delivery of the video and audio content and the presentation materials. Since the speaker's presentation contains all three components, i.e. audio and video content and presentation materials, it has been problematic to handle the size of the various components in a reasonable manner, while incorporating updates and synchronizing the components so they are presented as they would be at a live lecture. Finally, it has been difficult to schedule and manage the presentations. This LBS system addresses all of these issues and, therefore, provides significant advantages over existing systems.

Illustrative Architecture

Figure 1:
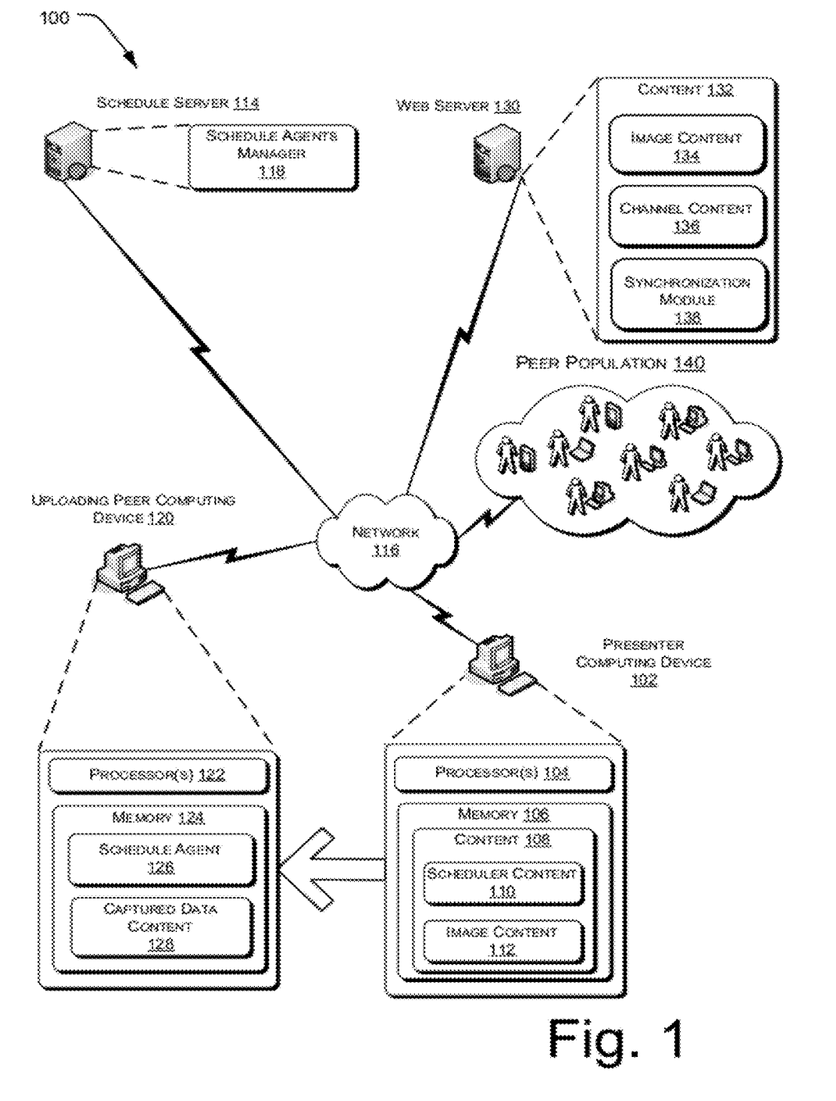
FIG. 1 depicts an illustrative architecture that implements an end-to-end lecture broadcast model.

FIG. 1 depicts an illustrative architecture 100 that provides an end-to-end broadcast architecture. As illustrated, the end-to-end broadcast architecture 100 includes a presenter computing device 102, a schedule server 114, an uploading peer computing device 120, a web server 130, a network 116 and a peer population 140.

The presenter computing device 102 contains processors 104, memory 106 and content 108. The content 108 may be scheduler content 110 and image content 112. The scheduler content 110 may be implemented by a software add-on attached to a calendaring program or a scheduler. The scheduler content 110 may include a processing unit that is responsible for generating a program schedule based on a calendaring program (e.g., Outlook®) and transmitting the generated schedule to a schedule server 114. The presenter computing device 102 may contain the scheduler content 110 or the scheduler content 110 may be located on a lecture host computing device. In some cases, the presenter computing device 102 and the lecture host computing device may be the same device. In other instances, the lecture host computing device may be a separate computing device that schedules the broadcast or lecture.

In an embodiment, a speaker or user first creates a scheduled event or broadcast request for the broadcast architecture. The user at the presenter computing device 102 can create a program schedule using a calendaring program. The concept is similar to scheduling a meeting within a company (e.g., on a local WAN or otherwise). The calendaring program including the software add-on to provide coordination and implementation capabilities with the broadcast architecture, is used to schedule the broadcast on the network 116. To accomplish the scheduling, the user inputs scheduler content 110 such as selecting the target lecture room and inputting metadata. Metadata includes such information as start and stop time of the broadcast, the broadcast title, an abstract summarizing the subject matter of the broadcast and the speaker's credentials. This listing provides the typical information that is input, however, many different types of similar information may be entered as needs dictate.

The image content 112, meanwhile includes presentation materials to be presented by the presenter. These presentation materials may include a slide presentation, such as Microsoft® PowerPoint® slide presentation, audio, video, images, documents, spreadsheets, or any type of presentation that is presented to an audience. A user will typically create the presentation materials that are presented in conjunction with the speaker at a live broadcast. For instance, a slide presentation can be projected onto a screen via a projector connected to a laptop computer or by other similar means.

After the program schedule is created in the presenter computing device 102, the program schedule information is sent to the schedule server 114. It is important to note that there may be many presenter computing devices connected to the network since different speakers may use different presenter computing devices for different lectures. The schedule server 114 is responsible for managing schedule agents 126 distributed in different lecture room or channels through schedule agents manager 118 and for handling scheduler content 110 sent from the presenter computing device 102. The schedule server 114 is responsible for handling a program schedule received from a scheduler and pushing it to the uploading peer computing device 120. The uploading peer computing device 120 contains one or more processors 122, memory 124, a schedule agent 126 and captured data content 128.

In an embodiment, different lectures (programs) may be held in different lecture rooms. To avoid conflicts in program scheduling and management, these programs are divided into different groups. In an embodiment, each lecture room is defined as a channel. All the lectures held in a lecture room are categorized into one channel that is associated with the lecture room.

The schedule agent 126 is located in the uploading peer computing device 120 and is responsible for handling program schedules sent from the schedule server 114. The schedule server 114 manages schedule agents for many uploading peer computing devices. Again, FIG. 1 is directed toward a single uploading peer computing device, but it is important to note that many uploading peer computing devices may be managed by the schedule server 114. An uploading peer computing device 120 is typically a processing unit responsible for managing the schedule received from a schedule server 114. The uploading peer computing device 120 also controls the status of the broadcasting process based on the schedule, processes captured data received from capturing devices, such as video/audio data, digitalized image data of the presentation slides, etc., generates synchronizing information between video/audio data and presentation slides, and transmits video/audio data and presentation slides to P2P overlay and the web server respectively. In some embodiments, a single uploading peer is associated with each channel.

The scheduler content 110, the schedule server 114 and the schedule agent 126 comprise the scheduling subsystem or module which is part of the broadcast architecture. As the uploading peer computing device 120 is unique for each channel, the schedule agent 126 is also unique for each channel. Consequently, the program schedule process in the lecture broadcasting system is channel-based, and the schedule server 114 performs channel-based program schedule management. Each schedule agent 126 registers with the schedule server 114 so that the schedule agent 126 is available and manageable. A lecture host or presenter computing device 102 schedules a presentation through a software add-on, which then submits the schedule request to the schedule server 114.

In conjunction with the scheduling information and management described above, the image content 112 from the presenter computing device 102 is sent to the uploading peer computing device 120. The image content 112 contains the presentation materials for the broadcast. For instance, the image content 112 may comprise a slide presentation.

The captured data content 128 in the uploading peer computing device 120 comprises audio and video captured from the broadcast room or channel. Microphone(s) are positioned in different locations around the room in which the presentation is taking place. The locations are typically picked based on proximity to the audio to be picked up, whether it is the speaker or audience. One or more microphones may be for the speaker and one or more microphones may be available for questions from an audience, if an audience exists. The audio from the microphones is captured using standard audio connections and equipment and the audio signal is routed to the uploading peer computing device 120.

Likewise, a video camera is located in the room in which the presentation takes place. The video camera is positioned in a place where there is an unobstructed view of the speaker. Capturing devices include a video camera that captures the video signal and a microphone or microphones that captures an audio signal. Capturing devices may also include a video/audio capturing adaptor that digitizes the video/audio signal and compresses the signal into a designed format. Finally, capturing devices may also include a VGA to USB device that captures VGA output from the speaker's PC and transforms it into digital images. All the captured materials are processed in the uploading peer computing device 120 before being broadcasted.

The presentation materials from the presenter computing device 102 are sent to the uploading peer computing device 120 for initial processing. At this point, the captured data content 128, i.e., the audio content, the video content and the presentation materials, are all stored on the uploading peer computing device 120. As will be described in more detail later, the audio content and the video content are streamed from the uploading peer computing device 120 in real time to a peer-to-peer network for broadcast to peers who have requested access to the broadcast.

The captured presentation materials, meanwhile, are sent to a web server 130. The web server 130 serves as a web portal and contains content 132 which may include image content 134 and channel content 136. The image content 134 includes storage of and access to the captured presentation materials. The channel content 136 includes information on all the channels listed on a homepage and all the upcoming programs listed on the corresponding channels' homepages. A homepage is a depiction on a display device which displays the results of a search by a user for the different presentations that occur in different lecture rooms or channels.

The uploading peer computing device 120 and the web server 130 comprise a transmission module. The uploading peer computing device 120 is responsible for transmitting video/audio content to the Internet/intranet using peer-to-peer (P2P) streaming technology. The web server 130 is responsible for the delivery of captured presentation materials and for ensuring the synchronous play back of video/audio content and presentation materials. The web server 130 also contains a synchronization module 138 that ensures that the presentation materials are presented in coordination with the audio and video content to reenact the overall presentation as someone sitting and watching the presentation in-person would see and hear the presentation. In other words, module 138 ensures that the peers who receive the presentation would see a particular slide at the same moment as when the video and audio content is presented, i.e. as the speaker is presenting and referring to a particular slide.

The uploading peer computing device 120 adds timestamp information to the captured data content 128 for use by the web server 130 and eventual coordination with a web based playback device discussed later.

This synchronization is one of the most important features in the LBS system, as this synchronization allows for simultaneous display of video and corresponding slides at the broadcast recipient in the peer population 140. In this LBS system, a mapping table between video timestamps and slides is established to realize this feature. One specific technique is described immediately below, although other embodiments may employ other techniques.

Figure 3:
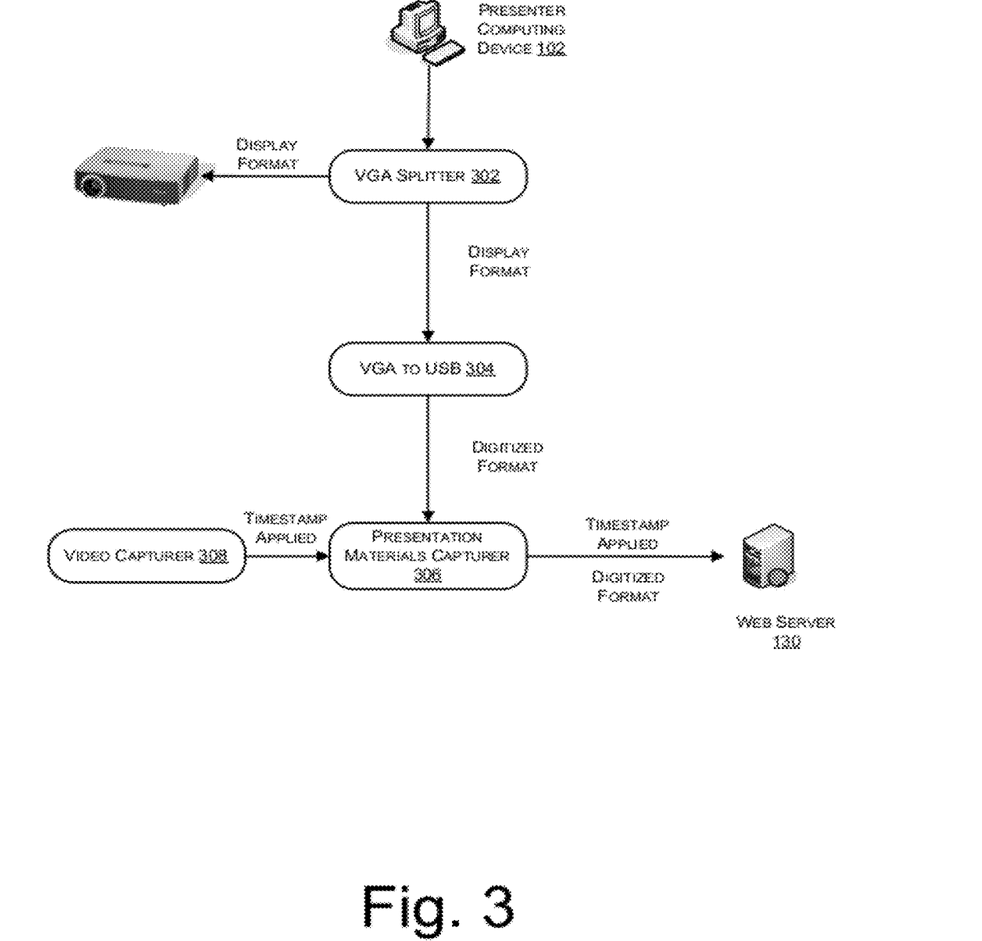
FIG. 3 depicts a model for capturing presentation materials for implementation in the architecture of FIG. 1.

At the uploading peer computing device 120, after a screen change occurs, i.e., some change in the presentation materials portion of the captured data content 128, the latest captured image data is encoded into a JPEG or other image file and uploaded to the web server 130. At the same time, the image capturer in the uploading peer computing device 120 queries the timestamp of the current video frame from a COM interface, called GetTimeStamp, provided by the video capture module and adds a presentation materials index or slide index and timestamp information to a .txt file. The image capturer comprises both a video capturer and presentation materials capturer as illustrated in FIG. 3 and discussed below. This process establishes a mapping table between the slide index and the video timestamp. Each time the txt file is updated, the updated text file is uploaded to the web server 130.

At the broadcast recipient in the peer population 140, the synchronous playback of video and slides is realized by a web-based player, which is mainly composed of an embedded video playback module and an image container (for displaying the slides). The web player periodically queries the real-time timestamp information of the video stream. After that the web player looks up the slide/video timestamp mapping table in the web server to get the corresponding slide index and displays the slide in the image container on the user interface at the broadcast recipient. As a result, the synchronous playback of slides and video is realized.

Finally, the presentation is transmitted to a broadcast recipient in the peer population 140. As stated earlier, P2P streaming technology is used to transmit the captured video/audio stream to the Intranet/Internet from the uploading peer computing device 120. Users of the LBS can also use a windows media server to complete the task.

The presentation materials are uploaded to the web server 130 where end users can directly download them. Since the image size of the slide is much smaller than that of the video frames, the presentation materials are directly downloaded and can easily be updated for change. It can be appreciated that even though a separate web server 130 and a schedule server 114 are described herein in one embodiment, one computing device can accomplish these tasks in other embodiments.

Illustrative Processes

Figure 2:
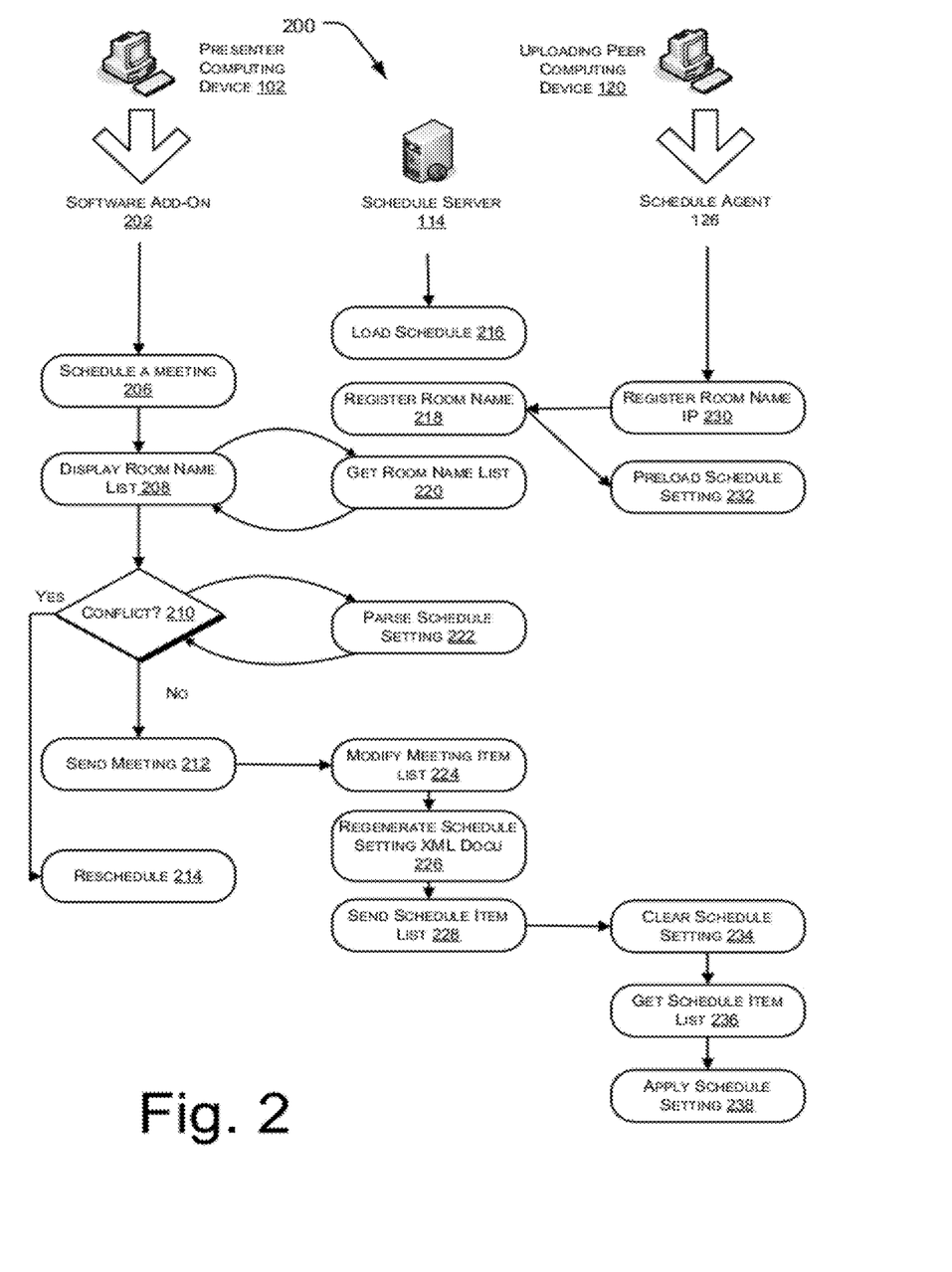
FIG. 2 depicts a schedule management model for implementation in the architecture of FIG. 1.

FIG. 2 depicts an illustrative process 200 for implementing the scheduling module that may be implemented by the architecture of FIG. 1 and/or by other architectures. This process 200 is illustrated as a collection of blocks in a logical flow graph, which represent a sequence of operations that can be implemented in hardware, software, or a combination thereof. In the context of software, the blocks represent computer executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

FIG. 2 illustrates the workflow of a channel-based program scheduling activity as a part of the LBS. Before the lecture hosts can schedule programs through the software add-on 202, the schedule server 114 and schedule agents 126 in target lecture rooms have to be started sequentially. First, the schedule server 114 loads the previous program schedule in operation 216 which includes all available channels from a database and listens to the messages sent from the software add-on 202 or schedule agents 126.

A schedule agent 126 sends out a registration message to the schedule server 114 in operation 218 containing the associated channel name when it is started in operation 230. Next, the schedule server 114 checks whether the channel name already exists in the database in operation 218. The schedule server 114 sends the associated program schedule in a suitable format, such as XML, to the schedule agent 126 if the channel already exists in the database in operation 232. The schedule server 114 adds the channel name to a database if it does not exist. Finally, the schedule agent 126 stores the program schedule and starts the broadcasting process if the start time arrives.

The details on how a new program is scheduled are shown in FIG. 2. The lecture host at the presenter computing device 102 first creates a broadcasting request in operation 206 using the software add-on 202. In operation 208, a list of display room names is to be displayed. The software add-on 202 contacts the schedule server 114 in operation 220 to get a list of available lecture rooms and displays them to the lecture host.

The lecture host at the presenter computing device 102 selects a target lecture room and enters some metadata, such as start/stop time, lecture title, abstract, and speaker's bibliography. These parameters are similar to those of a normal meeting request in Outlook® or other similar calendaring program.

After the lecture host clicks the send button, the software add-on in operation 210 checks with the schedule server 114 in operation 222 to confirm whether there is any time conflict between this program and other previously scheduled programs. If there is no time conflict, the software add-on 202 uploads the program schedule to the schedule server in operations 212 and 224. If there is a conflict between this program and other previously scheduled programs, the software add-on displays a message window telling the lecture host to re-schedule in operation 214.

The schedule server 114 updates the associated program schedule after receiving the broadcasting request. In operation 224, the schedule server 114 modifies the meeting item list in accordance with the meeting information received from the presenter computing device 102 in operation 212. The schedule server 114 then regenerates the schedule in operation 226 and sends the schedule item list in operation 228 to the schedule agent 126 in the target room.

The schedule agent 126 clears the schedule setting in operation 234, gets the schedule item list in operation 236 and applies the schedule setting in operation 238, i.e. the schedule agent 126 updates its program schedule with the newly received one from the schedule server 114.

FIG. 3 depicts a model for capturing presentation materials for implementation in the architecture of FIG. 1. FIG. 3 illustrates the workflow when capturing presentation slides from the presenter computing device 102. The output from the presenter computing device 102 is split into two parts by a splitter 302. The format of the output may be any format which provides for display of the materials, such as VGA. One part is input to a projector for display in the lecture room, while the other part is sent to a conversion device 304. For instance, the conversion device may convert VGA to USB for storage on a computing device. At the conversion device 304, the output is transformed into digitized image frames, such as bitmap images. A presentation materials capturer in the uploading peer computing device captures the presentation slides 306. The presentation materials capturer 306 or slide capturer analyzes each frame to check whether the content of the presenter computing device 102 display has been changed. If the screen has been changed, the slide capturer compresses the latest frame into a digitized image, such as JPEG, and uploads it to the web server 130. At the same time, the slide capturer 306 queries the current timestamp from the video capture module 308 and sends the timestamp information corresponding to the captured presentation slide to the web server 130.

The conversion device 304 can capture one or more frames per second, but since the presentation slides used by a speaker normally do not change that quickly, it is not necessary to upload every frame. In the LBS, the slide capturer 306 detects the screen change event and uploads the captured frame each time the screen changes.

Figure 4:
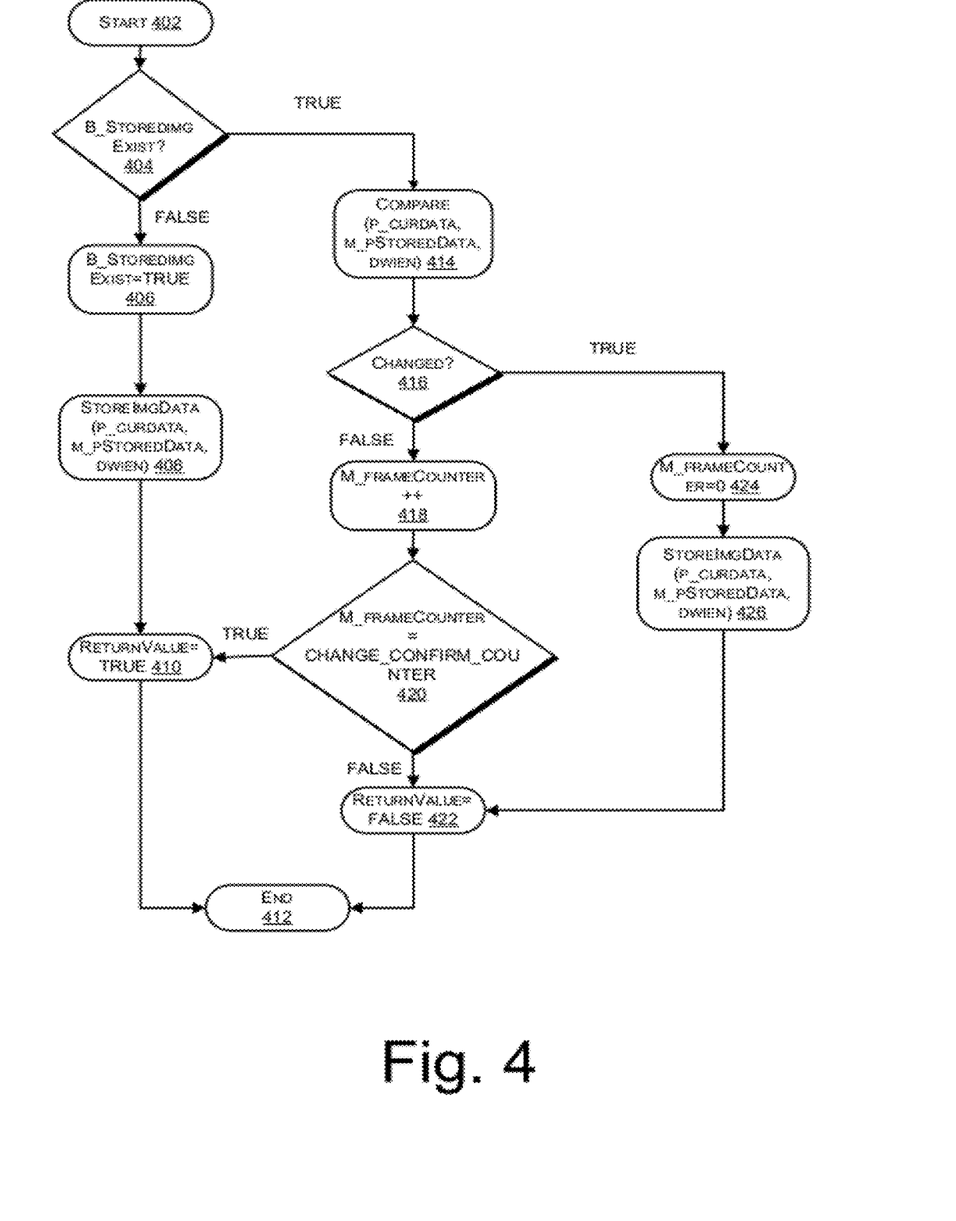
FIG. 4 depicts an illustrative process for determining when a change occurs in the presentation materials.

FIG. 4 depicts an illustrative process for determining when a change occurs in the presentation materials. As stated in the description of FIG. 3, a change in a particular slide in the presentation materials should be detected and uploaded to provide coordination between the presentation materials and the audio and video content. FIG. 4 describes how the screen change is detected.

The presentation materials are received by the uploading peer computing device at operation 402. Operation 404 determines if data has been stored before. If no data has been stored before, i.e., b_StoredImgExist==FALSE, then this is the first time that the VGA to USB device has captured a frame. In operation 406, b_StoredimgExist is set to equal TRUE and the frame data p_curdata is stored in memory in operation 408. At operation 410 the return value is equal to TRUE and the process proceeds to the end in operation 412 to upload the screen change and the new data.

If, however, operation 404 determines the presence of pre-existing data, the process proceeds to operation 414. In operation 414, p_curdata is compared with the stored data by a predefined comparison function. If p_curdata is the same as the stored data in operation 416, m_frameCounter is increased by 1 in operation 418. If the m_frameCounter is equal to CHANGE_CONFIRM_COUNTER in operation 420, then a return value equal to TRUE is made in operation 410 and a screen change is uploaded at the end operation in 412. It is important to note that CHANGE_CONFIRM_COUNTER in operation 420 is a timing criterion for determining whether the screen has in fact changed. If a captured frame is different from the former one and the consecutive CHANGE_CONFIRM_COUNTER captured frames remain unchanged, the screen change is said to have in fact occurred. This is designed to avoid the case where the slide image changes too quickly.

If p_curdata is different from the stored data, the frame has been changed. The m_frameCounter is then reset to 0 in operation 424. In operation 426, p_curdata is stored and a screen unchanged indication is returned in operation 422 since CHANGE_CONFIRM_COUNTER has not been reached. The end is reached at operation 412 and no screens are changed.

The algorithm for comparing frame data in the process in FIG. 3 is described as follows. For a captured image with width X (pixels) and height Y (pixels), the image is split into N blocks, where $$N = DEF\_COMPARE\_RESOLUTION * DEF\_COMPARE\_RESOLUTION$$

where DEF_COMPARE_RESOLUTION is a predefined parameter.

For each block, the difference BlockDiff is calculated between the captured image and the stored image:

$$BlockDiff(i) = \frac{\sum_{j=n}^{Bi} Diff(j)}{a * b}$$

where Bi is the number of pixels in block i, while a and b represent the width (pixels) and height (pixels) of each block, which are constant. As each pixel is represented by three values (R/G/B values), Bi should include all the elements of all the pixels in block i.

For block i, if BlockDiff(i) has reached DEF_BLOCK-CHANGE_THRESHOLD, the block has been changed and a counter named diffNum is increased by 1. For the whole image, if diffNum exceeds DEF_IMGCHANGE_THRESHOLD, it means that a certain number of blocks in the image have been changed. In this case, it can be determined that the current captured image is different from the former one.

Figure 5:
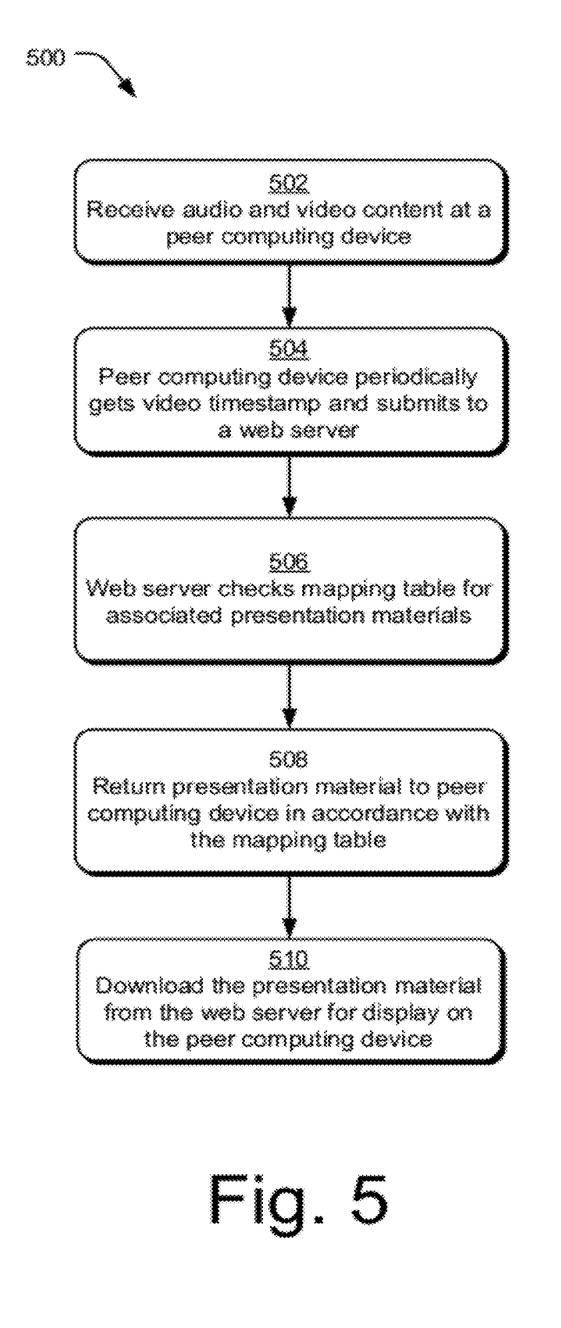
FIG. 5 depicts an illustrative process for synchronizing video/audio content and presentation slides at client side.
Figure 6:
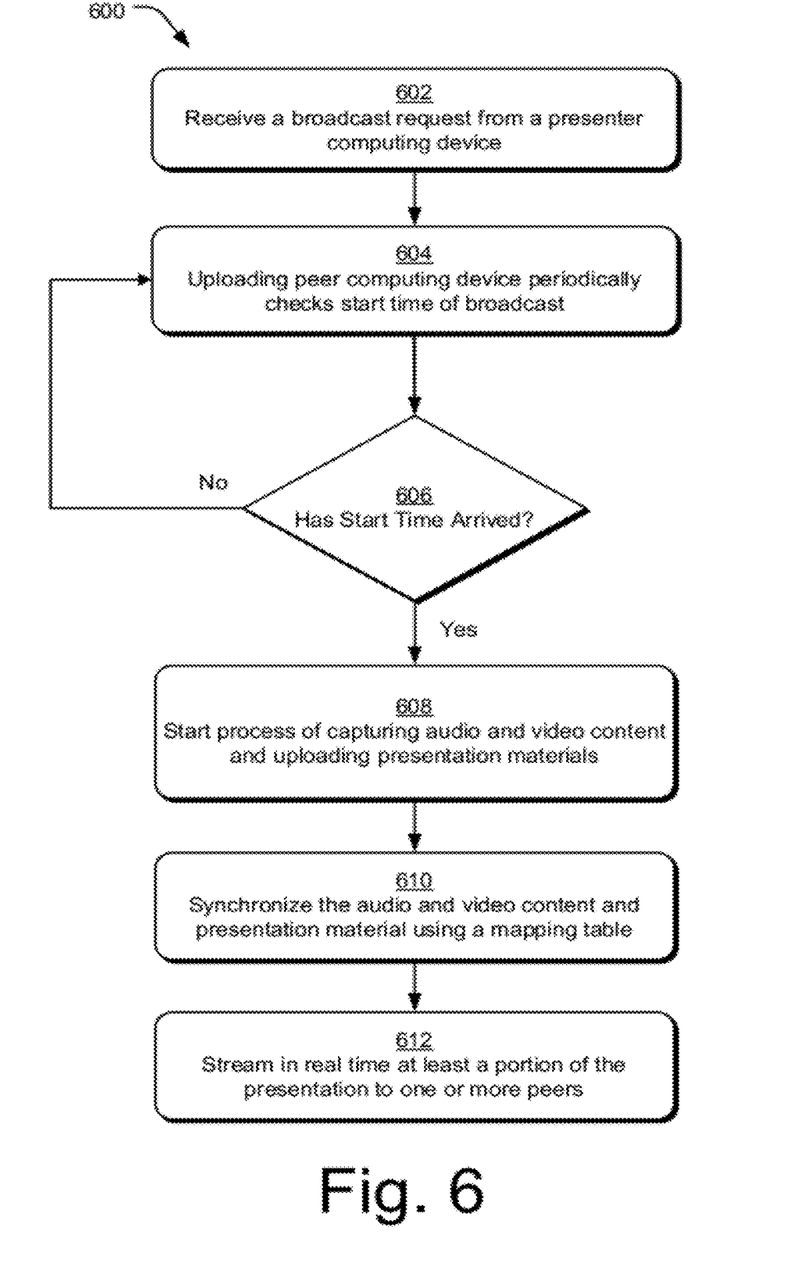
FIG. 6 depicts an illustrative process that demonstrates how an uploading peer computing device will initiate the lecture broadcast system of FIG. 1.

FIG. 5 depicts an illustrative process for synchronizing video/audio content and presentation slides at the client side. The client side in this instance is where the user views the broadcast. The process begins by receiving audio and video content at a peer computing device in operation 502 for allowing a participant to watch the lecture. During the playback of video/audio, the peer computing device periodically receives the current video timestamp in operation 504 and checks with the mapping table in the web server to see if there is any presentation material to be associated with this timestamp in operation 506. In operation 508, presentation materials are sent to the peer computing device in accordance with the mapping table results. In other words, the timestamp/slide index information in the mapping table determines the presentation materials to be sent to the peer computing device. In operation 510, the identified presentation materials are downloaded to the peer computing device from the web server for display at the peer computing device FIG. 6 depicts an illustrative process that demonstrates how an uploading peer computing device will initiate the LBS. The process 600 begins with receiving a broadcast request from a presenter computing device in operation 602. In operation 604, the uploading peer computing device periodically checks the start times for a particular lecture or broadcast. In operation 606, if the start time has not yet arrived, the process returns to operation 604 and the start times continue to be checked. If the start time has arrived in operation 606, the process of capturing the audio and video content from the lecture and uploading presentation materials begins in operation 608. In operation 610, the audio and video content and the presentation materials are synchronized using a mapping table as described above. Operation 612 provides for the streaming of at least a portion of the presentation to one or more peers. In an embodiment, the audio and video content is streamed in real time and the presentation materials are uploaded from the web server to the peer on-the-fly, i.e. as they are changed. The change confirmation description above and the mapping table synchronization process also described above are instrumental in this operation.

Conclusion

The description herein describes an end-to-end live lecture broadcasting system. The broadcasting system possesses features such as a channel-based program scheduling and management system operated through a calendaring program and real-time video/audio and presentation materials capturing mechanism utilizing an algorithm that provides automatic on-the-fly capturing of presentation materials from the presenter's computing device. The system also provides for transmission of the presentation using peer-to-peer (P2P) streaming technology and uploading of the presentation to provide for synchronous playback of video/audio and presentation materials at a peer who requests access to the presentation.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
under control of one or more processors configured with executable instructions:
receiving, at a first peer computing device of a peer-to-peer architecture, audio and video content associated with a presentation provided by a presenting computing device;
receiving, at the first peer computing device, data content of presentation materials associated with the presentation;
detecting a change in the data content of the received presentation materials, the detecting comprising determining that a difference between a latest frame and a previous frame of the data content of the received presentation materials is greater than a predetermined threshold;
in response to detecting the change in data content of the received presentation materials, encoding the latest frame of the data content of the received presentation materials into a file, uploading the file to a web server, and querying a current timestamp of the audio and video content associated with the presentation;
synchronizing the received audio and video content with the received presentation materials using one or more timestamps associated with each detected change of the data content of the received presentation materials; and
sending the synchronized audio content, video content, and presentation materials to one or more other peer computing devices of the peer-to-peer architecture for consumption by the one or more other peer computing devices.

2. The method according to claim 1, wherein synchronizing the received audio and video content with the received presentation materials comprises establishing a mapping table between the received presentation materials and the received audio and video content.

3. The method according to claim 1, wherein consumption by the one or more other peer computing devices comprises playing the synchronized audio content, video content and presentation materials on the one or more other peer computing devices, wherein the one or more other peer computing devices periodically query a mapping table, the mapping table containing presentation materials index information and video timestamp information.

4. The method according to claim 3, wherein the consumption is conducted by a web-based player used to play the synchronized video content and presentation materials on the one or more other peer computing devices.

5. The method according to claim 1, wherein the audio content is received by the presenting computing device from one or more microphones at a location in audible proximity to a speaker.

6. The method according to claim 1, wherein the video content is received by the presenting computing device from a video camera at a location in an unobstructed line-of-sight to a speaker.

7. A system comprising:
one or more processors;
memory, communicatively coupled to the one or more processors, storing instructions that, when executed by the one or more processors, configure the one or more processors to perform acts comprising:
receiving a broadcast request from a presenting computing device, the broadcast request specifying a start time and channel for association with a presentation to be provided by the presenting computing device; and in response to determining that the start time is reached, capturing the presentation provided by the presenting computing device;

capturing audio and video content associated with the presentation to be provided by the presenting computing device;

capturing presentation materials associated with the presentation provided by the presenting computing device;

in response to detecting a change in the captured presentation materials, uploading a new piece of the captured presentation materials to a web server without uploading each piece of the captured presentation materials to the web server;

synchronizing the uploaded new piece of the presentation materials with the captured audio and video content or instructing the web server to synchronize the uploaded new piece of the presentation materials with the captured audio and video content; and streaming in real time at least a portion of the presentation to one or more other peers of a peer-to-peer architecture that have requested to receive the presentation.

8. The system according to claim 7, wherein the acts further comprise sending the presentation materials to the web server in response to receiving the presentation materials.

9. The system according to claim 7, wherein the broadcast request further includes a title of the presentation, an abstract of the presentation, and information about a speaker that is associated with the presentation.

10. The system according to claim 7, wherein the channel is associated with a particular room in a building.

11. The system according to claim 7, wherein the captured audio content is captured from one or more microphones in audible proximity to a speaker associated with the presentation.

12. The system according to claim 7, wherein the captured video content is captured from a video camera in an unobstructed line-of-sight to a speaker associated with the presentation.

13. The system according to claim 7, wherein synchronizing the captured audio and video content with the uploaded new piece of the presentation materials comprises receiving timestamp information related to the audio content and the video content to establish a mapping table, the mapping table containing presentation materials index information and video timestamp information.

14. The system according to claim 7, wherein the broadcast request originates from a calendaring program.

15. A method comprising:
under control of one or more processors configured with executable instructions:
receiving, at a first peer computing device of a peer-to-peer architecture, video content and data content of presentation materials associated with a presentation provided by a presenting computing device, the video content including a video component, an audio component and a timestamp component;
responsive to detecting changes in the data content of the presentation materials,
encoding a latest frame of the data content of the presentation materials that is associated with the detected change into a file,
uploading the file that is associated with the detected change to a web server without uploading each frame of the data content of the presentation materials to the web server, and
querying a current timestamp of the video content from the timestamp component;
synchronizing the video content with the presentation materials; and
streaming the synchronized video content and sending the presentation materials to one or more other peer computing devices of the peer-to-peer architecture for consumption by the one or more other peer computing devices.

16. The method according to claim 15, wherein the audio component is received by the presenting computing device from one or more microphones at a location in audible proximity to a speaker associated with the presentation.

17. The method according to claim 15, wherein the video content is received from a video camera in an unobstructed line-of-sight to a speaker associated with the presentation.

18. The method according to claim 15, wherein a web-based player is used to play the synchronized video content and presentation materials on the one or more other peer computing devices.

19. The method according to claim 18, wherein the web-based player periodically queries the timestamp component from the video content and accesses information contained in a mapping table in the web server to display the presentation materials and the video content synchronously.

20. The method according to claim 15, wherein the presentation materials comprise presentation slides being operated on the presenting computing device.

* * * * *